Patented June 11, 1946

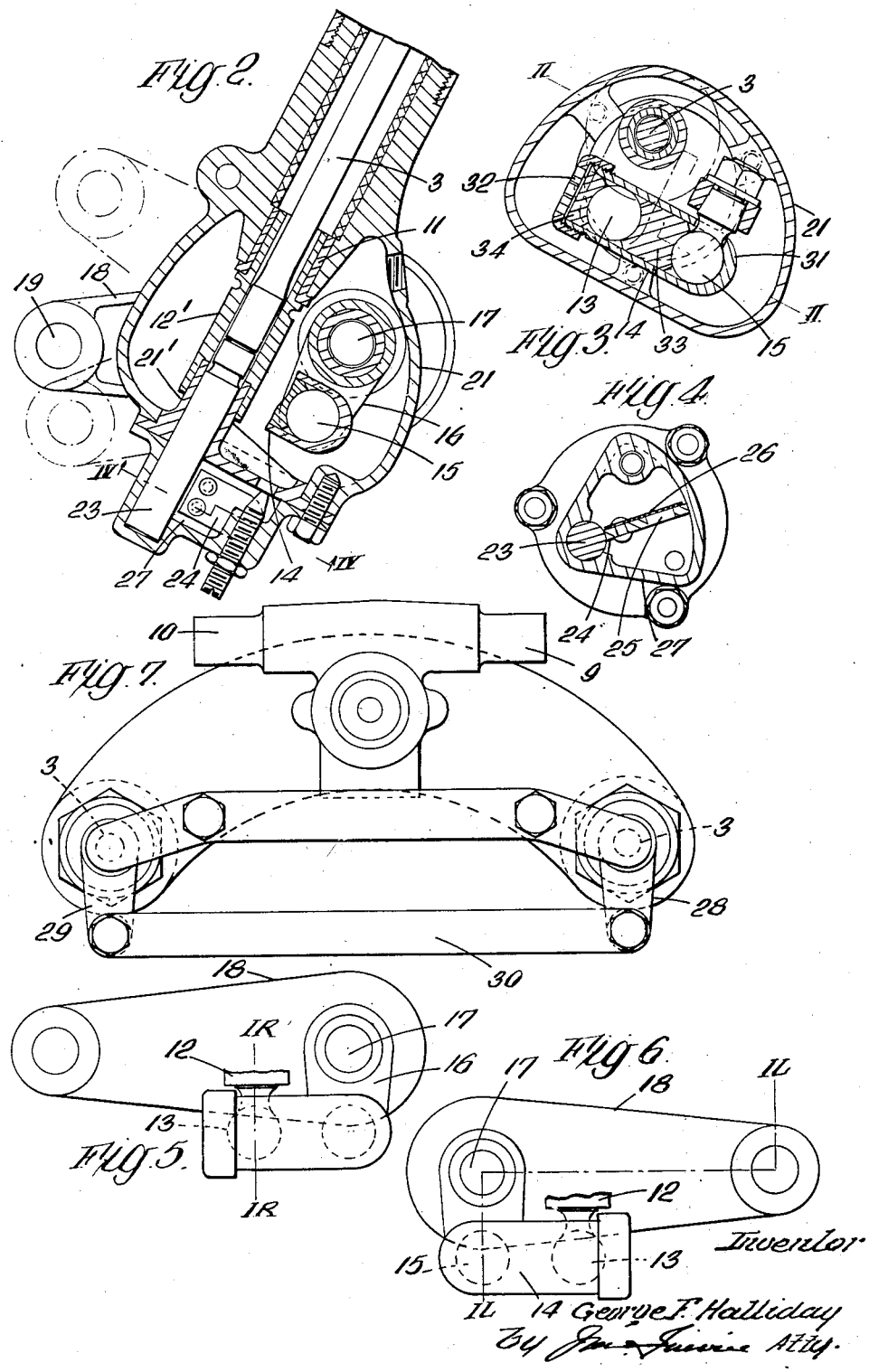

2,401,869

UNITED STATES PATENT OFFICE 2,401,869

RESILIENT SUSPENSION OF VEHICLE WHEELS

George Frederic Halliday, Kingswood, Bristol, England, assignor to Aero Engines Limited, Bristol, England Application December 11, 1944, Serial No. 567,604
In Great Britain October 5, 1943

8 Claims. (Cl. 280—286)

This invention relates to the spring suspension of vehicle and aircraft wheels and has for its primary object a resilient suspension for a wheel supported by a forklike structure such as for example the front wheel of cycle, motor cycle, or undercarriage wheels of an aircraft.

According to the present invention a resilient mounting for a wheel mounted in a fork and including a torsion bar of which one end is fixed, is characterised in that the other end of the torsion bar is connected to one end of a spindle on which the wheel is mounted, by radius arms and linkage.

The connection between the torsion bar and wheel spindle preferably includes a link which at opposite ends is connected by ball joints to the torsion bar and to a lever keyed to a spindle to which is also keyed a radial arm in which one end of the wheel spindle is mounted.

Damping means may be provided on the torsion bars or any part of the mechanism.

The invention will now be described by way of example with reference to the accompanying drawings, wherein—

Figure 2 is a section on the line II—II of Fig. 3.

Figure 3 is a section on the line III—III of Fig. 1.

Figure 4 is a section on the line IV—IV of Fig. 2.

Figures 5 and 6 are respectively views looking at the right and left hand sides of Figure 1, with parts broken away and Figure 7 is a plan of the upper end of Figure 1.

Figure 1:
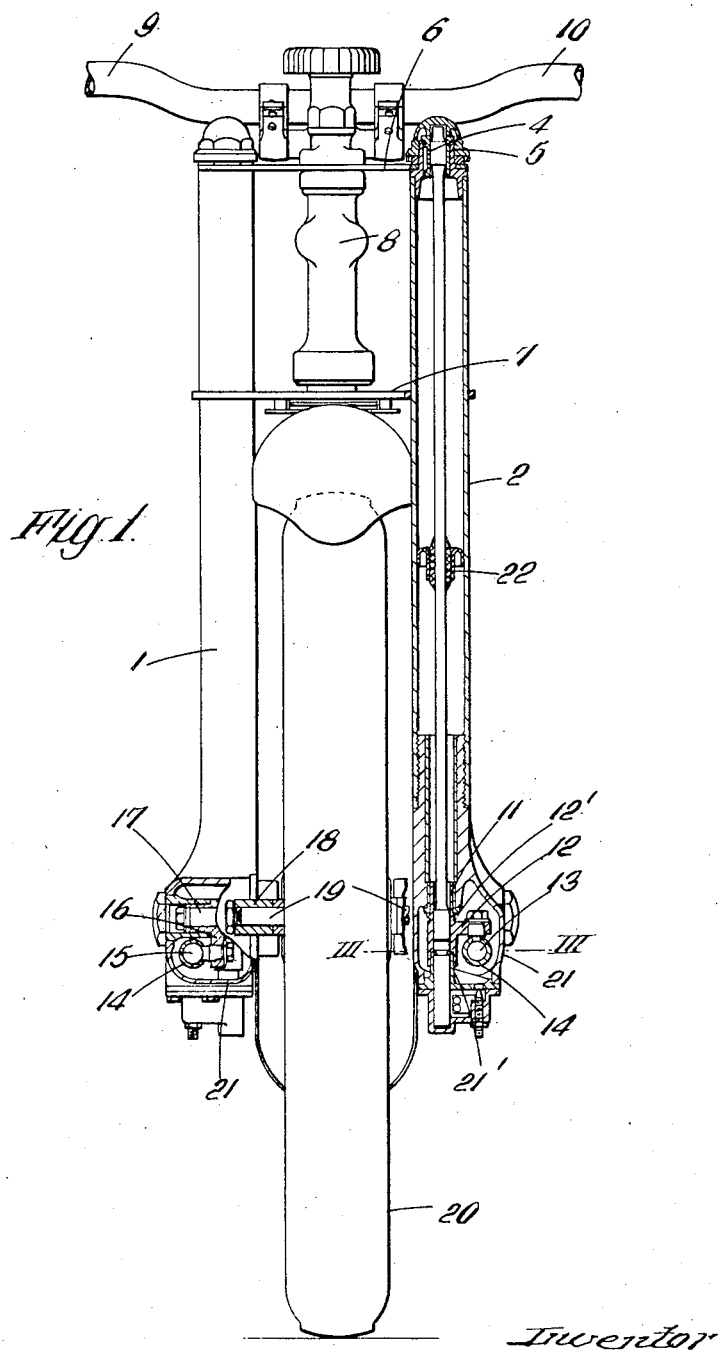
Figure 1 is a front view, partly in section, of a motor cycle, the right hand lower portion of Fig. 1 being a section on the line IR—IR of Figure 5 and the left hand lower portion of Fig. 1 being a section on the line IL—IL of Figure 6.

As shown in the drawings, the two limbs 1, 2 of a fork are hollow and are made of sufficient internal diameter so as each to accommodate conveniently a torsion bar spring 3. The torsion bar 3 in each limb is anchored at the upper end by being keyed as indicated at 4, in a boss 5 provided on an anchor plate 6 which serves to connect together the upper end of the limbs 1, 2.

The two limbs 1, 2 are also braced together by a second anchor plate 7, the anchor plates supporting a steering column 8, the upper plate 6 having the handle bars 9, 10 secured thereto.

The lower end of each torsion bar 3 passes freely through a suitable bush 11 in the lower end of the limbs 1, 2, which latter are of tubular form.

At its lower end each torsion bar 3 has a lever 12 keyed thereto through the medium of a sleeve 12' of which one end engages with the bush 11 whilst the other end fits over a boss 21' of a box 21. A ball joint 13 at the outer end of the lever 12 engages with one end of a link 14 connected by a ball joint 15 at its other end to a lever or radius arm 16 keyed to a spindle 17 to which is keyed a radial lever 18 at the outer end of which is mounted one end of a spindle 19 on which a wheel 20 is mounted. The whole of this mechanism is carried in the box 21 at the lower end of each of the fork limbs 1, 2 and which box 21 forms an oil bath.

The link 14, as shown in Fig. 3, consists of a tubular member having a semi-spherical closed end 31 and is closed at its other end by a screw cap 32. The ball joints 13 and 15 are spaced apart by a distance piece 33 having concave recesses in its ends. A member 34 with a concave recess is located between the ball joint 13 and the cap 32.

A pivot pin 23 at the lower end of the torsion bars 3 may be provided with any suitable damping means, such as a blade 24 provided with an aperture 25 over which is located a flap 26 closing in one direction only. The blade 24 is located in an oil bath 27.

The torsion bars are supported at points intermediate their ends by a rubber bush 22 which surrounds the corresponding torsion bar 3, to which it is secured in any suitable manner, and of which the peripheral surface fits the interior of the limb 1, 2.

The connection between the torsion bars 3 and their corresponding radial spindle levers 18 is preferably such that as the wheel rises or falls, the torsion bars 3 are twisted simultaneously in opposite directions.

The fixed or anchored ends of the torsion bars 3 may have attached to them levers 28, 29 (Fig. 7), the free outer ends of which are coupled together by a link 30. This lever-link system 28, 29, 30 provides a means for equalising the loads on the torsion bars 3.

Whilst the invention has been described above more specifically as applied to the front wheel of a motor cycle, it will be understood that it is also applicable to the mounting of other wheels, such as those of a cycle or the undercarriage wheels of an aircraft.

What I claim is:

1. In a resilient wheel suspension, the combination with a hollow fork limb, a torsion bar fixed at its upper end in said limb, and a wheel spindle, of a ball joint at the free end of said torsion bar, a link engaged at one end by said ball joint, a second ball joint at the other end of said link, a lever engaging said second ball joint, a shaft to which said lever is keyed and rotatably mounted upon the fork limb, and a radial arm having one end keyed to said shaft carrying the wheel spindle at the opposite end.

2. In a resilient wheel suspension, the combination with a hollow fork limb, a torsion bar fixed at its upper end in said limb, and a wheel spindle, of a lever keyed to the free end of said torsion bar, a ball joint at the end of said lever, a link having one end thereof engaging said ball joint, a second ball joint at the other end of said link, a second lever engaging said second ball joint, a shaft to which said lever is keyed and rotatably mounted upon the fork limb, and a radial arm having one end keyed to said shaft carrying the wheel spindle at the opposite end.

3. In a resilient suspension according to claim 2, the provision of a box forming an oil bath in which said first and second levers, the link, and the ball joints are disposed.

4. A resilient mounting according to claim 2, including supporting means associated with said torsion bar, said supporting means comprising at least one rubber bush surrounding said torsion bar at an approximate mid-length position, the periphery of said bush fitting the interior of the hollow fork limb in which said torsion bar is located.

5. In a resilient suspension, the combination with a hollow fork limb, a torsion bar anchored at its upper end in said limb, a horizontal transverse shaft pivoted in the lower end of the fork limb, a horizontal axle arm fixed to the horizontal shaft, and a wheel axle mounted at the free end of said axle arm for rising and falling movement, of connecting means between the torsion bar and the axle arm comprising a lever keyed to the lower end of the torsion bar so as to extend substantially parallel with the axle, a ball joint at the end of said lever, a link attached to said ball joint and extending tangentially with respect to the torsion bar, a second lever keyed to the transverse shaft and extending in a plane parallel with the torsion bar, and a second ball joint between the end of the link and the second lever.

6. In a resilient suspension, the combination with a hollow fork limb, a torsion bar anchored at its upper end in said limb, a horizontal transverse shaft pivoted in the lower end of the fork limb, a horizontal axle arm fixed to the horizontal shaft, and a wheel axle mounted at the free end of said axle arm for rising and falling movement, of connecting means between the torsion bar and the axle arm comprising a lever keyed to the lower end of the torsion bar so as to extend substantially parallel with the axle, a ball joint at the end of said lever, a link attached to said ball joint and extending tangentially with respect to the torsion bar, a second lever keyed to the transverse shaft and extending in a plane parallel with the torsion bar, and a second ball joint between the end of the link and the second lever, the link acting in compression to transmit the load of the vehicle from the torsion bar to the axle arm.

7. A resilient suspension according to claim 5 in which the link comprises a hollow casing formed at one end with a part-spherical seating for one of the ball joints, a part-spherical seating member disposed within the other end for the other ball joint and disposed between said ball joints a thrust member having its ends shaped to cooperate with the two ball joints so as to transmit force in compression from one ball joint to the other.

8. In a resilient suspension according to claim 2 the provision of a box forming an oil bath in which said first and second levers, the link, and the ball joints are disposed, the shaft being arranged to extend through the box for connection to the axle arm disposed externally of said box, and a vaned damping device operatively connected with the torsion bar and arranged to be moved thereby through the oil in the oil bath.

GEORGE FREDERIC HALLIDAY.